3,562,285
ETHYL 3-(N-SUBSTITUTED-AMINO)-4H-PYRROLO
[3,4-C]ISOTHIAZOLE-5(6H)-CARBOXYLATES
Shreekrishna Manmohan Gadekar, Trenton, and Bernard Dean Johnson, Montvale, N.J., and Elliott Cohen, Pearl River, N.Y., assignors to American Cyanamid Company, Stamford, Conn., a corporation of Maine
No Drawing. Filed Mar. 6, 1968, Ser. No. 710,779
Int. Cl. C07d 91/10, 91/12
U.S. Cl. 260—306.8          6 Claims

ABSTRACT OF THE DISCLOSURE

This disclosure describes compounds of the class of ethyl 3 - (N - substituted - amino)-4H-pyrrolo[3,4-c]isothiazole - 5(6H) - carboxylates useful as antifungal agents and as central nervous system depressants.

BRIEF SUMMARY OF THE INVENTION

This invention relates to new organic conmopnds and, more particularly, is concerned with novel ethyl 3-(N-substituted - amino) - 4H - pyrrolo[3,4-c]isothiazole-5(6H)-carboxylates and methods of preparing these compounds. The novel compounds of the present invention may be represented by the following general formula:

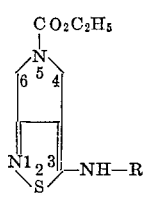

wherein R is hydrogen, lower alkanoyl or 3,4,5 - trimethoxybenzoyl. Suitable lower alkanoyl groups contemplated by the present invention are those having up to 4 carbon atoms such as formyl, acetyl, propionpl, isobutyryl, and the like.

DETAILED DESCRIPTION OF THE INVENTION

The novel compounds of the present invention are generally obtainable as white to tan crystalline materials having characteristic melting points and absorption spectra. The free bases are appreciably soluble in such solvents as methanol, ethanol and dimethylformamide but relatively less soluble in such solvents as benzene and toluene. They are, however, generally insoluble in water.

The free bases of this invention form acid-addition salts with a variety of organic and inorganic salt-formng reagents. Thus acid-addition salts, formed by admixture of the organic free base with an equivalent amount of an acid, suitably in a neutral solvent, are formed with such acids as sulfuric, phosphoric, hydrochloric, hydrobromic, citric, lactic, tartaric, acetic, gluconic, ascorbic, and the like and the acid-addition salts so formed are soluble in water. For purposes of this invention, the organic free bases are equivalent to their acid-addition salts.

The novel ethyl 3 - (N - substituted amino)-4H-pyrrolo-[3,4 - c]isothiazole - 5(6H) - crboxylates of the present invention may be readily prepared by a sequence of reactions as illustrated in the following reaction scheme:

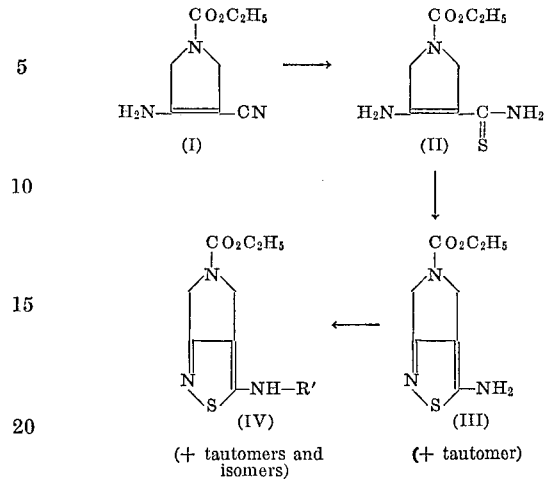

(+ tautomers and isomers)      (+ tautomer)

wherein R' is lower alkanoyl or 3,4,5 - trimethoxybenzoyl. In accordance with the above reaction scheme, N-carboxyl - 3 - imino - 4-cyanopyrrolidine (I) is treated with hydrogen sulfide in ethanolic potassium hydroxide at the reflux temperature of the reaction mixture for a period of about 6 hours whereby there is formed the intermediate N - carbethoxy - 3 - amino-4-thiocarbamoyl-3-pyrroline (II). The intermediate (II) is then treated with 30% hydrogen peroxide in a vigorously stirred mixture of carbon tetrachloride and water at room temperature for about one hour whereby there is obtained the ethyl 3-amino - 4H - pyrrolo - [3,4-c]isothiazole-5(6H)-carboxylate (III). Acylation of (III) with a lower alkanoic anhydride of 3,4,5 - trimethoxybenzoyl chloride under conditions described in the examples forms the corresponding ethyl 3 - (N - acylamino) - 4H-pyrrolo[3,4-c]isothiazole-5(6H) - carboxylate (IV). The products (III and IV) are isolated and purified by standard procedures well known to those skilled in the art.

The novel ethyl 3 - (N - substituted - amino)-4H-pyrrolo - [3,4 - c]isothiazole - 5(6H)-carboxylates of the present invention may exist in other tautomeric and isomeric forms as follows:

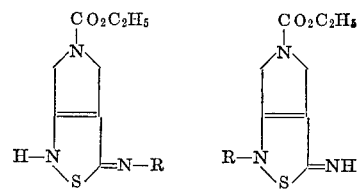

wherein R is as hereinabove defined. All such tautomeric and isomeric forms of the ethyl 3 - (N - substituted-amino) - 4H - pyrrolo-[3,4-c]isothiazole-5(6H)-carboxylates are, therefore, included within the purview of the present invention and the description of one form is intended to include the tautomers and isomers thereof.

The novel compounds of the present invention are biologically active and have been found to possess antifungal activity. The antifungal spectrum of the compounds of this invention, representing the amount required to inhibit the growth of various typical fungi, was determined in a standard manner by the agar dilution streak technique as follows. In the assay 250, 125 and 62 micrograms per milliliter concentrations of test compound are made up in 10 milliliter portions of fluid nutrient agar.

These dilutions are then poured into petri dishes and hardened. Spore suspensions of the test organism are streaked on the agar surfaces, and the plates are suitably incubated and then read. By way of illustration, the minimal inhibitory concentrations, expressed in micrograms per milliliter of ethyl 3 - amino - 4H - pyrrolo[3,4-c]isothiazole - 5(6H) - carboxylate against various test organisms is set forth in Table I below:

TABLE I

| Organism | Minimal inhibitory conc. (mcg./ml.) |
| --- | --- |
| Microsporum canis | 62 |
| Trichophyton rubrum | 62 |
| Trichophyton tonsurans | 62 |
| Trichophyton mentagrophytes | 62 |
| Microsporum gypseum | 125 |

The excellent activity against dermatophytic Trichophyton and Microsporum species coupled with the relative chemical stability of the novel compounds of the present invention, makes them useful in the treatment of fungal infections of the skin of warm-blooded animals. For such use these compounds may be formulated with appropriate topically useful carriers such as wetting agents, stabilizing agents, dusting powders, ointments, creams, lotions, etc. The formulated compounds can be applied topically to the infected skin area. The topical compositions may contain from 0.2% to 5% of active component with a topically acceptable carrier.

The novel compounds of the present invention are central nervous system depressants and were shown to possess CNS depressant activity as determined by animal experiments as follows. The test compound was administered intraperitoneally in a 2% aqueous starch vehicle to a group of 10 mice. Strychnine sulfate dissolved in aqueous saline was then administered subcutaneously at a dose (0.82 mg./kg. of body weight) estimated to cause tonic extensor seizures in 95% of the mice. The strychnine sulfate was administered 30 minutes after administration of the test compound. In a representative operation, and merely by way of illustration, of ten mice so treated after treatment with 50 milligrams per kilogram of body weight of ethyl 3 - amino-4H-pyrrolo[3,4-c]isothiazole-5(6H)-carboxylate, five (50%) were protected against tonic extensor seizures.

The invention will be described in greater detail in conjunction with the following specific examples.

EXAMPLE 1

Preparation of N-carbethoxy-3-amino-4-thiocarbamoyl-3-pyrroline

A continuous but gentle stream of hydrogen sulfide was passed through a refluxing solution of 11.2 g. (0.2 mole) of potassium hydroxide and 9.05 g. (0.05 mole) of N-carbethoxy-3-imino-4-cyanopyrrolidine (I) in 100 ml. of ethanol for 6 hours. The hot mixture was filtered off and the filtrate on cooling afforded a second crop of the desired product. The combined material was recrystallized by dissolving it in 600 ml. of hot methanol and concentrating the solution to about 200 ml. The thionamide product (II) weighed 6.13 g. Further concentration gave another 0.47 g. of the same material; total 6.6 g. (61%). It melted at 247–251° C.

EXAMPLE 2

Preparation of ethyl 3-amino-4H-pyrrolo[3,4-c]isothiazole-5(6H)-carboxylate

A suspension of 5.37 g. (0.025 mole) of the thionamide from Example 1 in 250 ml. of carbon tetrachloride and 150 ml. of water was treated with 7.5 ml. of 30% hydrogen peroxide. The mixture was stirred vigorously for 1 hour and cooled in an ice bath whereupon the aminoisothiazole (III) which had precipitated was filtered off and dried. Additional product was obtained by concentrating the filtrate; total 3.78 g. (71%) melting at 198°–200° C.

EXAMPLE 3

Preparation of ethyl 3-(3,4,5-trimethoxybenzamido)-4H-pyrrolo[3,4-c]isothiazole-5(6H)-carboxylate A mixture of 0.43 g. (0.002 mole) of the aminoisothiazole, 0.46 g. (0.002 mole) of 3,4,5-trimethoxybenzoyl chloride, 0.25 ml. of pyridine and 10 ml. of methylene chloride was stirred and was allowed to stand at room temperature for 24 hours. The mixture was evaporated in vacuo to a solid. The solid was triturated with water and then suspended in 300 ml. of hot acetone. The insoluble material was filtered off, the filtrate was cooled. The acylated product which had separated was filtered and dried, M.P. 264–267° C.

EXAMPLE 4

Preparation of ethyl 3-acetamido-4H-pyrrolo[3,4-c]isothiazole-5(6H)-carboxylate

A mixture containing 0.43 g. (0.002 mole) of the aminoisothiazole and 10 ml. of acetic anhydride was heated for ½ hour until a clear solution was obtained. Removal of the anhydride in vacuo gave a solid which on two recrystallizations from aqueous ethanol weighed 0.25 g. (45%) and melted at 238–239° C.

What is claimed is:
1. A compound selected from the group consisting of those of the formula:

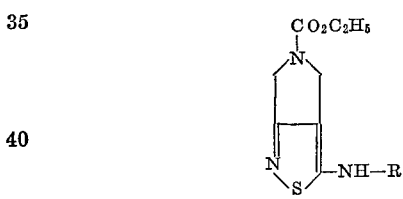

wherein R is selected from the group consisting of hydrogen, lower alkanoyl and 3,4,5-trimethoxybenzoyl; the tautomers and isomers thereof; and the non-toxic acid-addition salts thereof.

2. A compound according to claim 1 wherein R is hydrogen.

3. A compound according to claim 1 wherein R is hydrogen and in the form of its hydrochloride salt.

4. A compound according to claim 1 wherein R is acetyl.

5. A compound according to claim 1 wherein R is propionyl.

6. A compound according to claim 1 wherein R is 3,4,5-trimethoxybenzoyl.

References Cited

UNITED STATES PATENTS 3,309,368    3/1967    Gadekar et al. _____ 260—256.4

ALTON D. ROLLINS, Primary Examiner

U.S. Cl. X.R.

260—306.7; 424—270